(12) United States Patent
Wessels et al.

(10) Patent No.: US 7,898,730 B2
(45) Date of Patent: Mar. 1, 2011

(54) APPARATUS AND METHODS OF BROADBAND SECOND HARMONIC GENERATION

(75) Inventors: Bruce W. Wessels, Wilmette, IL (US); Pao T. Lin, Evanston, IL (US)

(73) Assignee: Northwestern University, Evanston, IL (US)

( * ) Notice: Subject to any disclaimer, the term of this patent is extended or adjusted under 35 U.S.C. 154(b) by 33 days.

(21) Appl. No.: 12/561,667

(22) Filed: Sep. 17, 2009

(65) Prior Publication Data

US 2010/0118386 A1    May 13, 2010

Related U.S. Application Data

(60) Provisional application No. 61/097,728, filed on Sep. 17, 2008.

(51) Int. Cl.
G02F 2/02 (2006.01)
(52) U.S. Cl. ............... 359/328; 359/332; 372/22
(58) Field of Classification Search ............... 359/328, 359/332; 372/22
See application file for complete search history.

(56) References Cited

U.S. PATENT DOCUMENTS 5,198,837 A * 3/1993 Ikshizaka et al. ............... 372/22
7,218,799 B2 * 5/2007 Deliwala ............... 385/8
7,224,878 B1 * 5/2007 Wessels et al. ............... 385/130

* cited by examiner

Primary Examiner—Hemang Sanghavi
(74) Attorney, Agent, or Firm—Tim Tingkang Xia; Morris, Manning & Martin, LLP

(57) ABSTRACT

Apparatus and methods for second harmonic generation with a waveguide. In one embodiment, a method includes the steps of providing a waveguide, wherein the waveguide has a substrate, and a polydomain epitaxial thin film on the substrate, wherein the polydomain epitaxial thin film defines a plane and has a first surface and a second, opposite surface defining a body portion of the polydomain epitaxial thin film therebetween with a film thickness, l, and wherein the polydomain epitaxial thin film has a coherence length, $l_c$, and exposing the waveguide to an incident photon beam with a wavelength and a focal point such that the incident photon beam is incident to the plane of the polydomain epitaxial thin film with an angle θ that is formed between the incident beam and the plane of the polydomain epitaxial thin film and satisfies the condition of 0<θ<90, wherein the polydomain epitaxial thin film is formed with the following condition satisfied: $l<l_c$. As generated, the second harmonic generation has a conversion efficiency substantially independent of the wavelength of the incident photon beam over the visible spectra range.

26 Claims, 7 Drawing Sheets

APPARATUS AND METHODS OF BROADBAND SECOND HARMONIC GENERATION

CROSS-REFERENCE TO RELATED PATENT APPLICATION

This application claims the benefit, pursuant to 35 U.S.C. §119(e), of U.S. provisional patent application Ser. No. 61/097,728, filed Sep. 17, 2008, entitled "Highly Efficient Broadband Second Harmonic Generation Using Polydomain Epitaxial Barium Titanate Thin Film Waveguides" by Bruce W. Wessels and Pao Tai Lin, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, superscript "n" represents the nth reference cited in the reference list. For example, superscript "13" represents the 13th reference cited in the reference list, namely, P. Tang, D. J. Towner, A. L. Meier, and B. W. Wessels, Appl. Phys. Lett. 85, 4615 (2004).

STATEMENT AS TO RIGHTS UNDER FEDERALLY-SPONSORED RESEARCH

This invention was made with Government support under Contract No. ECS0457610 awarded by National Science Foundation of the United States. Accordingly, the United States Government has certain rights in this invention.

FIELD OF THE INVENTION

The present invention relates generally to second harmonic generation, and more particularly to apparatus and methods for second harmonic generation by using a polydomain epitaxial thin film waveguide such as a polydomain epitaxial barium titanate thin film waveguide.

BACKGROUND OF THE INVENTION

Optical devices such as waveguides, filters, switches, and photonic circuits with a broadband optical response are highly desirable for advanced optical communication systems.[1-3] A technique for generation of light over a wide spectral range is second harmonic generation (SHG). For efficient conversion, quasiphase matching is typically required whereby the relative phase difference between the interacting waves is corrected by using periodic structures. Two approaches include periodic poling of nonlinear media and formation of photonic crystals.[4,5] The utilization of periodic structures, however, limits the performance to a narrow range of wavelengths. Recently, generation of broadband SHG, however, was demonstrated in disordered, nonlinear optical media using random quasiphase matching.[6,7]

For efficient SHG, a material with a large second order nonlinear optical coefficient is required. Of the nonlinear optical materials, ferroelectric oxides are widely utilized due to their intrinsically high optical nonlinearities. While lithium niobate has been widely studied for SHG, other ferroelectrics have even larger nonlinear coefficients. In particular ferroelectric $BaTiO_3$ (BTO) has been shown to have excellent nonlinear optical properties.[8,9] Optically transparent epitaxial thin film waveguides of BTO are also now available. In addition, thin films potentially enable integration of optical components. Several groups have already demonstrated deposition of BTO thin films on Si substrates.[10,11] By combining of BTO thin film deposition with Si semiconductor circuit processing, photonic circuits with rich functionality are expected.

SHG of light using BTO thin films has been previously demonstrated in the transmission mode where the pump light beam is normal to the film surface.[8] An obvious limitation of transmission SHG using thin films is the short light interaction length resulting in low conversion efficiency.[12] Another disadvantage of the transmission is that the SHG mode is not suitable for integration of optical components.

Therefore, a heretofore unaddressed need exists in the art to address the aforementioned deficiencies and inadequacies.

SUMMARY OF THE INVENTION

The present invention, in one aspect, relates to a method for second harmonic generation with a waveguide. In one embodiment, the method includes the steps of providing a $BaTiO_3$ (BTO) waveguide, wherein the BTO waveguide has a substrate, a nano-dimensioned BTO film on the substrate, and a ridge component on the BTO film, and wherein the BTO film defines a plane and has a first surface and a second, opposite surface, and exposing the BTO waveguide to an incident photon beam with a wavelength and a focal point such that the focal point of the incident photon beam is substantially on the BTO film and the incident photon beam is incident to the plane of the BTO film with an angle θ that is formed between the incident beam and the plane of the BTO film and satisfies the condition of 0<θ<90, wherein an output photon beam with second harmonic generation is generated, and wherein the focal point of the incident photon beam is located on the first surface of the BTO film or between the first surface and the second surface of the BTO film. As generated, the second harmonic generation has a conversion efficiency substantially independent of the wavelength of the incident photon beam over the visible spectra range.

In one embodiment, the substrate comprises a MgO substrate. The substrate can also be made with other suitable materials. The ridge component includes $Si_3N_4$ and has a thickness ranging from about 100 nm to about 300 nm, and the BTO film has a thickness ranging from about 300 nm to about 700 nm, is epitaxial and multidomain with a and c oriented ferroelectric domains, and has a coherence length larger than the thickness of the BTO film.

The BTO waveguide further comprises two opposed, substantially coplanar electrodes, each electrode on an opposed side of the ridge component.

In one embodiment, the incident photon beam is from a laser, and the beam comprises a laser beam of photons. The laser is operable at a wavelength in the range of 10 to 5,000 nm and with an output intensity in the range of 0.5 to 1,000 mJ.

In one embodiment, the BTO waveguide is placed in a waveguide station having XYZ flexture stages such that the plane of the BTO film is parallel to one of the X-Y plane, the X-Z plane, and the Y-Z plane. The BTO waveguide can also be positioned with help from other means and/or in a different configuration as long as the set up allows the focal point of the incident photon beam to be substantially on the BTO film and the incident photon beam not to be normal to the plane of the BTO film.

The present invention, in another aspect, relates to a method for second harmonic generation. In one embodiment, the method includes the steps of providing a layered structure, wherein the layered structure has a substrate, and a BTO film on the substrate, and wherein the BTO film defines a plane and has a first surface and a second, opposite surface, and exposing the layered structure to an incident photon beam with a wavelength and a focal point such that the focal point of the incident photon beam is substantially on the BTO film and the incident photon beam is not normal to the plane of the BTO film, wherein an output photon beam with second harmonic generation is generated, and wherein the focal point of the incident photon beam is located on the first surface of the BTO film or between the first surface and the second surface of the BTO film.

In one embodiment, the substrate comprises a MgO substrate. The substrate can also be made with other suitable materials. The BTO film has a thickness ranging from about 300 nm to about 700 nm, is epitaxial and multidomain with a and c oriented ferroelectric domains, and has a coherence length larger than the thickness.

In one embodiment, the incident photon beam is from a laser, and the beam comprises a laser beam of photons. The laser is operable at a wavelength in the range of 10 to 5,000 nm and with an output intensity in the range of 0.5 to 1,000 mJ.

In one embodiment, the layered structure is a BTO waveguide that is placed in a waveguide station having XYZ flexture stages such that the plane of the BTO film is parallel to one of the X-Y plane, the X-Z plane, and the Y-Z plane depending on which direction an incident photon beam comes from, among other things. The BTO film can also be positioned with help from other means and/or in a different configuration as long as the set up allows the focal point of the incident photon beam to be substantially on the BTO film and the incident photon beam not to be normal to the plane of the BTO film.

The present invention, in yet another aspect, relates to a system for second harmonic generation. In one embodiment, the system has a $BaTiO_3$ (BTO) waveguide, wherein the BTO waveguide has a substrate, and a BTO film on the substrate, and wherein the BTO film defines a plane and has a first surface and a second, opposite surface. The system further has an energy source for providing a photon beam with a wavelength, and optical means for receiving the photon beam from the energy source and focusing a corresponding photon beam with a focal point incident to the BTO waveguide such that the focal point of the incident photon beam is located on the first surface of the BTO film or between the first surface and the second surface of the BTO film, and the incident photon beam is not normal to the plane of the BTO film.

In one embodiment, the BTO film has a thickness ranging from about 300 nm to about 700 nm, is epitaxial and multidomain with a and c oriented ferroelectric domains, and has a coherence length larger than itsf thickness.

The energy source comprises a laser, and the beam comprises a laser beam of photons. The laser is operable at a wavelength in the range of 10 to 5,000 nm and with an output intensity in the range of 0.5 to 1,000 mJ.

In one embodiment, the system further has a waveguide station having XYZ flexture stages, wherein the BTO waveguide is placed in the waveguide station such that the plane of the BTO film is parallel to one of the X-Y plane, the X-Z plane, and the Y-Z plane. The BTO film can also be positioned with help from other means and/or in a different configuration as long as the set up allows the focal point of the incident photon beam to be substantially on the BTO film and the incident photon beam not to be normal to the plane of the BTO film.

In one embodiment, the optical means comprises at least one objective lens, which position relative to the BTO waveguide is adjustable to allow the focal point of the incident photon beam to be focused as a desired position on the BTO film.

The present invention, in a further aspect, relates to a method for second harmonic generation. In one embodiment, the method includes the steps of providing a waveguide, wherein the waveguide has a substrate, and a polydomain epitaxial thin film on the substrate, wherein the polydomain epitaxial thin film defines a plane and has a first surface and a second, opposite surface defining a body portion of the polydomain epitaxial thin film therebetween with a film thickness, l, and wherein the polydomain epitaxial thin film has a coherence length, $l_c$, and exposing the waveguide to an incident photon beam with a wavelength and a focal point such that the incident photon beam is incident to the plane of the polydomain epitaxial thin film with an angle θ that is formed between the incident beam and the plane of the polydomain epitaxial thin film and satisfies the condition of 0<θ<90, wherein an output photon beam with second harmonic generation is generated, and wherein the polydomain epitaxial thin film is formed with the following condition satisfied: $l<l_c$.

In one embodiment, the substrate comprises a MgO substrate. The substrate can also be made with other suitable materials.

In one embodiment, the polydomain epitaxial thin film comprises a BTO film. The BTO film has a thickness ranging from about 300 nm to about 700 nm, is epitaxial and multidomain with a and c oriented ferroelectric domains, and has a coherence length larger than the thickness. More specifically, the coherence length of the BTO film $l_c$ ranges from 1,600 nm to 2,900 nm.

In one embodiment, the incident photon beam is from a laser, and the beam comprises a laser beam of photons. The laser is operable at a wavelength in the range of 10 to 5,000 nm and with an output intensity in the range of 0.5 to 1,000 mJ.

The present invention, in yet a further aspect, relates to a system for second harmonic generation. In one embodiment, the system has a waveguide, wherein the waveguide has a substrate, and a polydomain epitaxial thin film on the substrate wherein the polydomain epitaxial thin film defines a plane and has a first surface and a second, opposite surface defining a body portion of the polydomain epitaxial thin film therebetween with a film thickness, l, and wherein the polydomain epitaxial thin film has a coherence length, $l_c$. The system further has an energy source for providing a photon beam with a wavelength, and optical means optical means for receiving the photon beam from the energy source and focusing a corresponding photon beam with a focal point incident to the waveguide such that the incident photon beam is incident to the plane of the polydomain epitaxial thin film with an angle θ that is formed between the incident beam and the plane of the polydomain epitaxial thin film and satisfies the condition of 0<θ<90, wherein an output photon beam with second harmonic generation is generated, and wherein the polydomain epitaxial thin film is formed with the following condition satisfied: $l<l_c$.

In one embodiment, the polydomain epitaxial thin film comprises a BTO film. The BTO film has a thickness ranging from about 300 nm to about 700 nm, is epitaxial and multidomain with a and c oriented ferroelectric domains, and has a coherence length larger than the thickness. More specifically, the coherence length of the BTO film $l_c$ ranges from 1,600 nm to 2,900 nm.

The energy source comprises a laser, and the beam comprises a laser beam of photons. The laser is operable at a wavelength in the range of 10 to 5,000 nm and with an output intensity in the range of 0.5 to 1,000 mJ.

In one embodiment, the system further has a waveguide station having XYZ flexture stages, wherein the waveguide is placed in the waveguide station such that the plane of the polydomain epitaxial thin film is parallel to one of the X-Y plane, the X-Z plane, and the Y-Z plane. The polydomain epitaxial thin film can also be positioned with help from other means and/or in a different configuration as long as the set up allows the focal point of the incident photon beam to be substantially on the polydomain epitaxial thin film and the incident photon beam not to be normal to the plane of the polydomain epitaxial thin film.

In one embodiment, the optical means comprises at least one objective lens, which position relative to the waveguide is adjustable to allow the focal point of the incident photon beam to be focused as a desired position on the polydomain epitaxial thin film.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
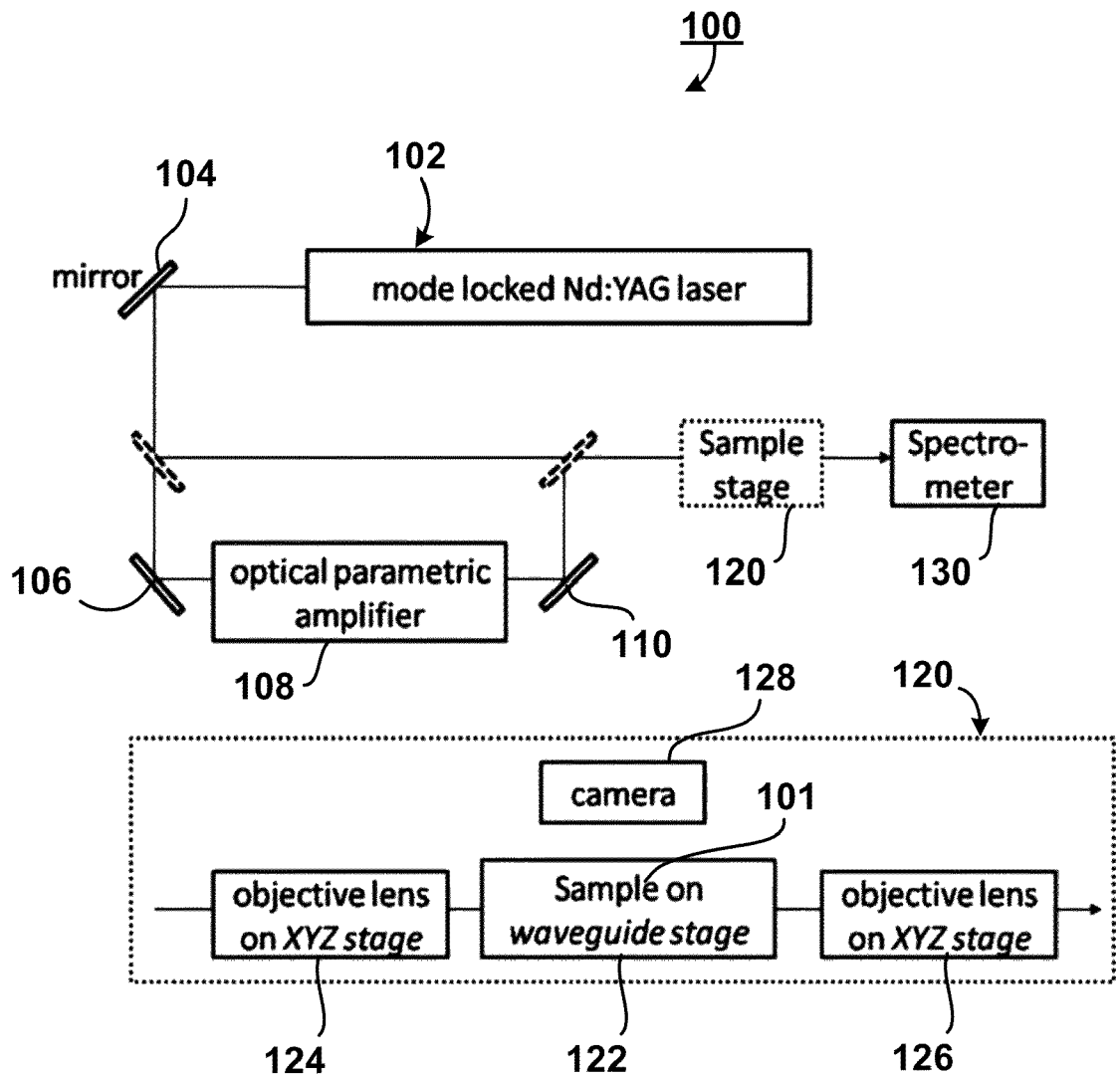
FIG. 1 schematically shows a setup for the SHG generation and measurement according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "second harmonic generation (SHG)" refers to a nonlinear optical process, in which photons interacting with a nonlinear material are effectively "combined" to form new photons with twice the energy, and therefore twice the frequency and half the wavelength of the initial photons.

Overview of the Invention

To achieve photonic circuits using a thin film, light is required to propagate within the plane of the thin film. Electrooptic modulators have been demonstrated using BTO as waveguides with superior nonlinear optical properties.[13] This invention relates to utilization of BTO waveguides for second harmonic generation, which has never been done before. Thus, utilization of a planar waveguide of BTO represents a new, nonobvisous, and surprising breakthrough for second harmonic generation, as shown below in more details.

The present invention, more specifically, in one aspect, relates to a method for second harmonic generation with a waveguide. In one example as shown below, broad band second harmonic generation (SHG) over the spectral range of 530-700 nm is generated using an epitaxial barium titanate (BaTiO3) thin film waveguide. The epitaxial layers are multidomain structure wise, which has both a and c domain variants. The SHG conversion efficiency is nearly independent of wavelength over the visible spectra range. An enhanced broadband conversion efficiency was observed that is attributed to random quasi-phase matching in the polydomain epitaxial layers. In contrast to existing knowledge of SHG for disordered nonlinear media, the observed SHG shows a quadratic dependence on pump power.

Various unique features of the present invention will be made as to the embodiments of the present invention in conjunction with the accompanying drawings in FIGS. 1-6.

Figure 1A:
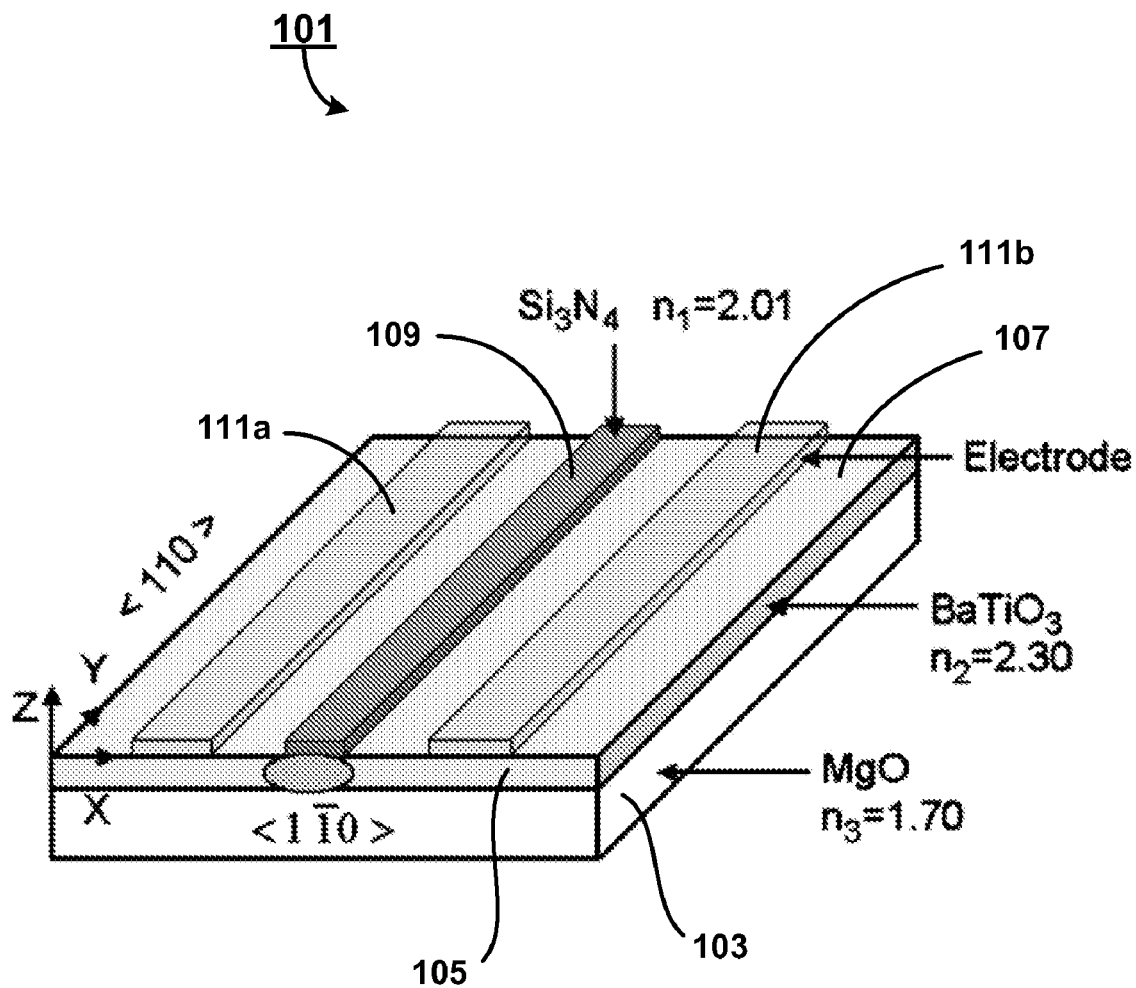
FIG. 1a schematically shows a BTO waveguide that is positioned in an X-Y plane and used to generate the SHG in connection with the set up of FIG. 1.

Referring to FIG. 1 and FIG. 1a first, the present invention, in one aspect, relates to a system for second harmonic generation. In one embodiment, such a system 100 has a BaTiO$_3$ (BTO) waveguide 101, one sample of which in one embodiment is shown in FIG. 1a, where the BTO waveguide 101 has a substrate 103, and a BTO film 105 on the substrate 103, and the BTO film 105 defines a plane 107, which is extending in the X-Y plane as shown. The BTO waveguide 101 also has a ridge component 109 that comprises $Si_3N_4$ and has a thickness ranging from about 100 nm to about 300 nm, where the ridge component 109 is on the BTO film 105.

The BTO waveguide 101 further has two opposed, substantially coplanar electrodes 111a, 111b, each of them on an opposed side of the ridge component 109, as shown in FIG. 1a.

The BTO film 105 has a thickness ranging from about 300 nm to about 700 nm and is epitaxial and multidomain with a and c oriented ferroelectric domains.

In one embodiment, the substrate 103 is a MgO substrate. The substrate 103 can also be made with other suitable materials.

In the embodiment as shown in FIG. 1a, the ridge component 109 has a thickness of about 125 nm and a refractive index $n_1=2.01$, the BTO film has a thickness of about 570 nm and a refractive index $n_2=2.30$, and the MgO substrate 103 has a thickness that is larger than that of the BTO film and a refractive index $n_3=1.70$. Such a BTO waveguide 101 is described in more details in U.S. Pat. No. 7,224,878, which is incorporated herein by reference in its entirety. Other types of BTO film or polydomain epitaxial thin film based waveguides may also be utilized to practice the present invention.

The system 100 also has an energy source 102 for providing a photon beam with a wavelength. In one embodiment, the energy source 102 is a laser, which emits a laser beam of photons in operation. The laser is operable at a wavelength in the range of 10 to 5,000 nm and with an output intensity in the range of 0.5 to 1,000 mJ.

The system 100 has optical means for receiving the photon beam from the energy source 102 and focusing a corresponding photon beam with a focal point incident to the BTO waveguide 101 such that the focal point of the incident photon beam is substantially on or within the BTO film 105 and the incident photon beam is not normal to the plane of the BTO film 105, which in the embodiment as shown in FIG. 1a is the plane 107 that is extending in the X-Y plane. In one embodiment, the optical means has at least one objective lens, objective lens 124 in the embodiment as shown in FIG. 1, which position relative to the BTO waveguide 101, being placed on a waveguide stage 122, is adjustable to allow the focal point of the incident photon beam to be focused as a desired position on or within the BTO film 105.

In one embodiment, the system 100 further has a waveguide station 122 that has XYZ flexture stages, where the BTO waveguide 101 is placed in the waveguide station 122 in operation such that the plane 107 of the BTO film 105 is parallel to the X-Y plane. The BTO film 105 can also be positioned with help from other means and/or in a different configuration as long as it allows the focal point of the incident photon beam to be substantially on the BTO film and the incident photon beam not to be normal to the plane of the BTO film.

Such a system 100 can be used for second harmonic generation. In one embodiment, referring now to FIG. 4, a method 400 for second harmonic generation is shown. At step 401, a BaTiO$_3$ (BTO) waveguide is provided, wherein the BTO waveguide has a substrate, a nano-dimensioned BTO film on the substrate, and a ridge component on the BTO film, and wherein the BTO film defines a plane. At step 403, the BTO waveguide is exposed to an incident photon beam with a wavelength and a focal point such that the focal point of the incident photon beam is substantially on the BTO film and the incident photon beam is not normal to the plane of the BTO film, wherein an output photon beam with second harmonic generation is generated. As generated, the second harmonic generation has a conversion efficiency substantially independent of the wavelength of the incident photon beam over the visible spectra range, which can be measured by means such as a spectrometer 130 shown in FIG. 1.

In one embodiment, the substrate is a MgO substrate. The substrate can also be made with other suitable materials. The ridge component comprises $Si_3N_4$ and has a thickness ranging from about 100 nm to about 300 nm, and the BTO film has a thickness ranging from about 300 nm to about 700 nm and is epitaxial and multidomain with a and c oriented ferroelectric domains.

The BTO waveguide further may have two opposed, substantially coplanar electrodes, each the electrode on an opposed side of the ridge component.

The incident photon beam is from a laser, and the beam comprises a laser beam of photons. The laser is operable at a wavelength in the range of 10 to 5,000 nm and with an output intensity in the range of 0.5 to 1,000 mJ.

In one embodiment, the BTO waveguide is placed in a waveguide station having XYZ flexture stages such that the plane of the BTO film is parallel to the X-Y plane. The BTO waveguide can alternatively be placed in the waveguide station such that the plane of the BTO film is parallel to the X-Z plane or the Y-Z plane. The BTO waveguide can also be positioned with help from other means and/or in a different configuration as long as the set up allows the focal point of the incident photon beam to be substantially on the BTO film and the incident photon beam not to be normal to the plane of the BTO film.

Figure 5:
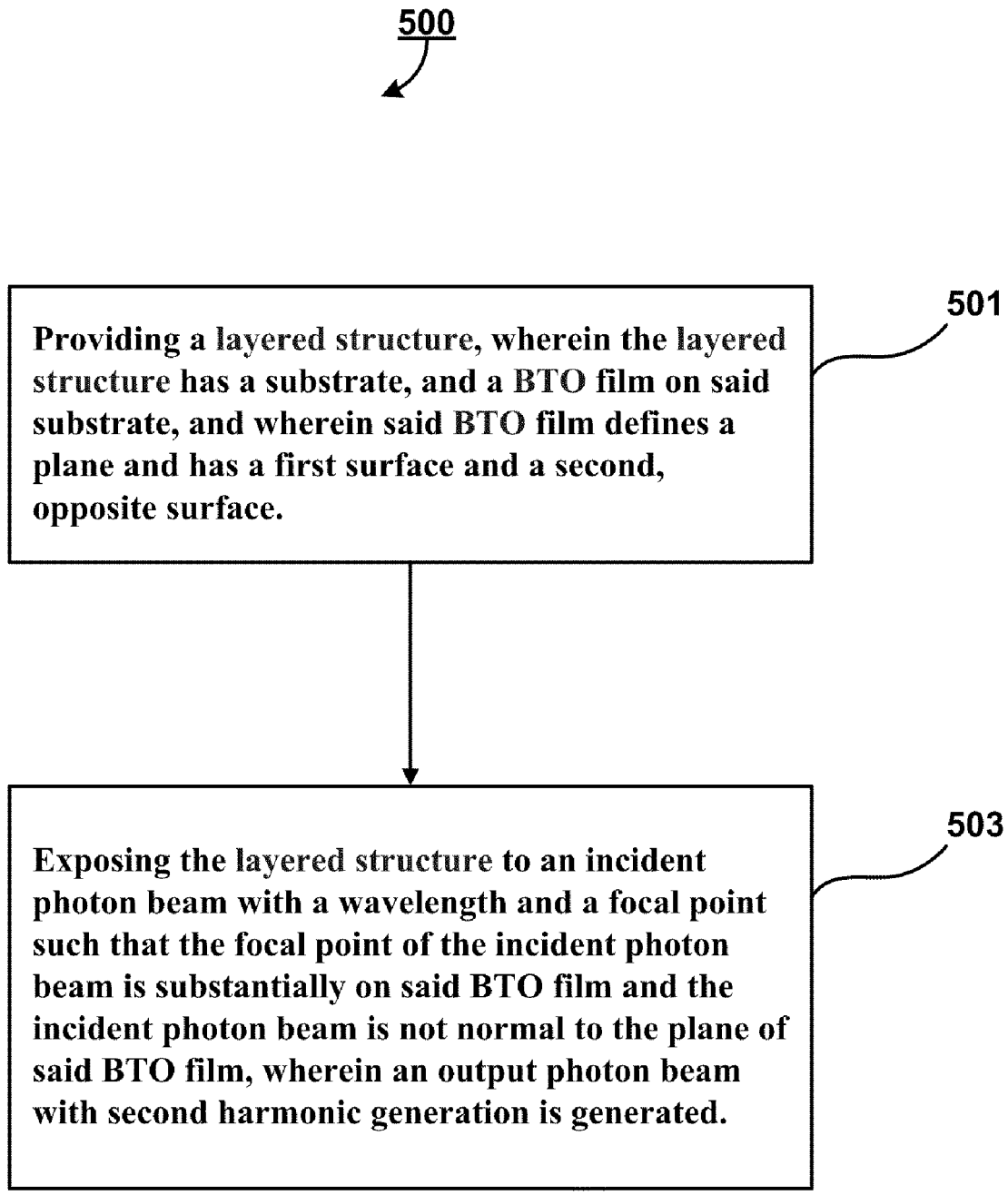
FIG. 5 shows a flow chart of a method for SHG according to another embodiment of the present application.

The present invention, in another aspect, relates to a method for second harmonic generation with a waveguide. In one embodiment as shown in FIG. 5, at step 501, a BaTiO$_3$ (BTO) waveguide is provided, wherein the BTO waveguide has a substrate, and a BTO film on the substrate, and wherein the BTO film defines a plane. At step 503, the BTO waveguide is exposed to an incident photon beam with a wavelength and a focal point such that the focal point of the incident photon beam is substantially on or within the BTO film and the incident photon beam is not normal to the plane of the BTO film, wherein an output photon beam with second harmonic generation is generated.

In one embodiment, the substrate is a MgO substrate. The substrate can also be made with other suitable materials. The BTO film has a thickness ranging from about 300 nm to about 700 nm and is epitaxial and multidomain with a and c oriented ferroelectric domains.

The incident photon beam is from a laser, and the beam comprises a laser beam of photons. The laser is operable at a wavelength in the range of 10 to 5,000 nm and with an output intensity in the range of 0.5 to 1,000 mJ.

In one embodiment, the BTO waveguide is placed in a waveguide station having XYZ flexture stages such that the plane of the BTO film is parallel to the X-Y plane. The BTO waveguide can alternatively be placed in the waveguide station such that the plane of the BTO film is parallel to the X-Z plane or the Y-Z plane. The BTO film can also be positioned with help from other means and/or in a different configuration as long as the set up allows the focal point of the incident photon beam to be substantially on the BTO film and the incident photon beam not to be normal to the plane of the BTO film.

Figure 6:
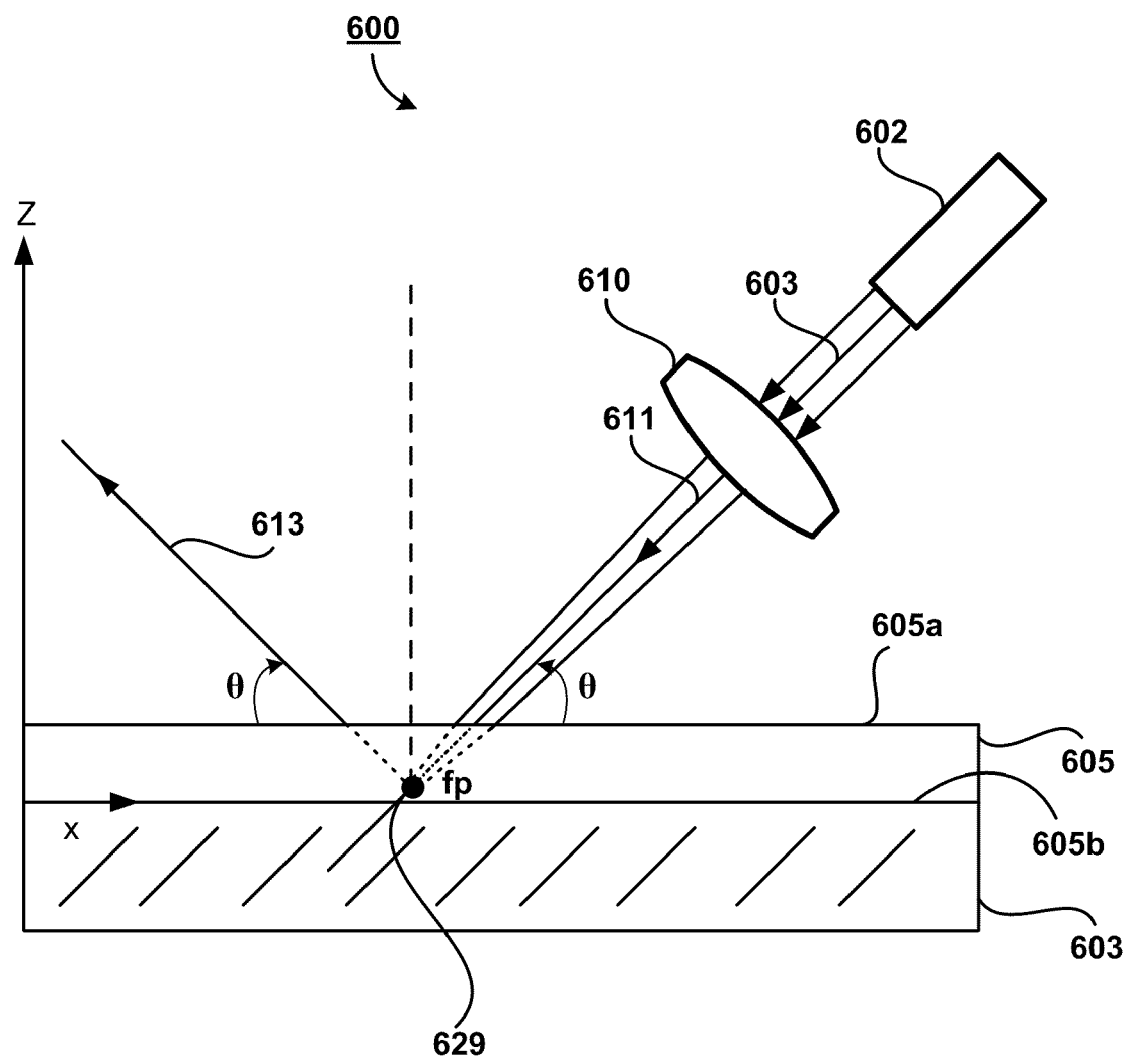
FIG. 6 schematically shows a waveguide that is positioned in an X-Y plane and used to generate the SHG according to another embodiment of the present application.

Referring now to FIG. 6, The present invention, in yet a further aspect, discloses a system 600 for second harmonic generation. In one embodiment, the system 600 has a waveguide that has a substrate 603, and a polydomain epitaxial thin film 605 formed on the substrate 603. The polydomain epitaxial thin film 605 defines a plane and has a first surface 605a and a second, opposite surface 605b defining a body portion of the polydomain epitaxial thin film 605 therebetween with a film thickness, l. As formed, the polydomain epitaxial thin film has a coherence length, $l_c$. In one embodiment, the polydomain epitaxial thin film 605 comprises a BTO film. The BTO film has a thickness ranging from about 300 nm to about 700 nm, is epitaxial and multidomain with a and c oriented ferroelectric domains, and has a coherence length larger than the thickness. More specifically, in this embodiment, the coherence length of the BTO film $l_c$ ranges from 1,600 nm to 2,900 nm. The polydomain epitaxial thin film 605 can also be made from other suitable materials as known to people skilled in the art such that the polydomain epitaxial thin film 605 is epitaxial, multidomain and has a coherence length larger than its thickness.

The system 600 further has an energy source 602 for providing a photon beam 603 with a wavelength, and optical means 610 for receiving the photon beam from the energy source 602 and focusing a corresponding photon beam 611 with a focal point (fp) 629 incident to the waveguide such that the incident photon beam 611 is incident to the plane, here the X-Y plane, of the polydomain epitaxial thin film 605 with an angle θ that is formed between the incident beam 611, or more precisely, the center line of the incident beam 611, and the plane of the polydomain epitaxial thin film 605 and satisfies the condition of 0<θ<90 to allow an output photon beam 613 with second harmonic generation to be generated, and wherein the polydomain epitaxial thin film 605 is formed with the following condition satisfied: $l<l_c$. It is noted that to generate an output photon beam 613 with second harmonic generation, the focal point (fp) 629 of the incident photon beam 611 is located on the first surface 605a that is facing the incident photon beam 611 or between the first surface 605a and the second, opposite surface 605b, i.e., within the body portion of the polydomain epitaxial thin film 605.

In one embodiment, the energy source 602 comprises a laser, and the beam comprises a laser beam of photons. The laser is operable at a wavelength in the range of 10 to 5,000 nm and with an output intensity in the range of 0.5 to 1,000 mJ.

In one embodiment, the system 600 may further have a waveguide station (not shown in FIG. 6 but see FIG. 1) having XYZ flexture stages, wherein the waveguide is placed in the waveguide station such that the plane of the polydomain epitaxial thin film is parallel to one of the X-Y plane, the X-Z plane, and the Y-Z plane. In the embodiment shown in FIG. 6, the plane of the polydomain epitaxial thin film 605 is parallel to the X-Y plane. The polydomain epitaxial thin film 605 can also be positioned with help from other means and/or in a different configuration as long as the set up allows the focal point of the incident photon beam to be substantially on the polydomain epitaxial thin film and the incident photon beam not to be normal to the plane of the polydomain epitaxial thin film.

The present invention, in a further aspect, relates to a method for second harmonic generation that can be practiced by a system 600 shown in FIG. 6. In one embodiment, the method includes the step of providing a waveguide, wherein the waveguide has a substrate 603, and a polydomain epitaxial thin film 605 on the substrate 603, wherein the polydomain epitaxial thin film 605 defines a plane and has a first surface 605a and a second, opposite surface 605b defining a body portion of the polydomain epitaxial thin film 605 therebetween with a film thickness, l. The polydomain epitaxial thin film 605 has a coherence length, $l_c$. The method further includes the step of exposing the waveguide to an incident photon beam with a wavelength and a focal point (fp) 629 such that the incident photon beam 611 is incident to the plane, in the exemplary embodiment shown in FIG. 6, the X-Y plane, of the polydomain epitaxial thin film 605 with an angle θ that is formed between the incident beam 611 and the plane of the polydomain epitaxial thin film 605 and satisfies the condition of 0<θ<90, wherein an output photon beam with second harmonic generation is generated, and wherein the polydomain epitaxial thin film 605 is formed with the following condition satisfied: $l<l_c$.

These and other aspects of the present invention are further described below.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

Examples

In one exemplary embodiment, the present invention is practiced by broadband SHG using polydomain, epitaxial BTO waveguides.

Utilization of poly-domain films in the waveguides avoids the critical phase matching requirement for broadband SHG. Light was generated over the visible spectral region from 530 to 700 nm. The SHG intensity was nearly independent of pump wave-length. Ultracompact broadband sources are potentially realizable by practicing the present invention.

Thin film waveguides were fabricated using BTO as the nonlinear media. As set forth above, however, waveguides that have a polydomain epitaxial thin film made from other suitable materials than BTO as known to people skilled in the art can also be used to practice the present invention so long as the polydomain epitaxial thin film is epitaxial, multidomain and has a coherence length larger than its thickness.

The BTO thin films were prepared by metal-organic chemical vapor deposition (MOCVD) as described elsewhere.[8] The waveguide has a 0.5 μm thick epitaxial film of BTO on MgO. The films were epitaxial but were multidomain consisting of a and c oriented ferroelectric domains as determined by x-ray diffraction.[8] A $Si_3N_4$ stripe, 0.2 μm thick, forms the 2 mm long waveguide.[13] An exemplary BTO thin film waveguide 101 is shown in FIG. 1a. The SHG properties of the BTO thin film waveguides are measured using a passive-active mode locked Nd:YAG (yttrium aluminum garnet) laser, which is identified as element 102 in FIG. 1. FIG. 1 shows the setup for SHG generation and measurements according to one embodiment of the present invention. The fundamental beam is a TEM00 mode at wavelength 1.064 μm, and the pulse width and repetition rate are 15 ps and 10 Hz, respectively. The laser beam was focused onto the waveguide by a first of front microscope objective lens 124 (Newport M-40X) with numerical aperture (NA) 0.65. The alignment of the laser beam from objective lens 124 to samples 101 is performed with an optical workstation 120 (Elliot Gold MDE 881). A back objective lens 126 is utilized to capture the output light beam from the sample 101. The positions of both the front and the back objective lens 124, 126 are adjustable by using the XYZ flexure stages. The Y travel and Z travel of the stages have very high resolution of 60 nm in order to precisely define the position of laser focal point. More specifically, the sample 101 is placed on a central waveguide station 122 of the optical workstation or sample stage 120. For the waveguide mode measurement, the BTO thin film plane 107 is parallel to X-Y plane, whereas it is parallel to Y-Z plane for the transmission mode measurement. The SHG signal from the BTO thin film waveguide is collected by a back or second objective lens 126 and focused into a fiber-optic bundle (not shown). The light output of the bundle is coupled to the entrance slit of a Spex Spec-One 500 M spectrometer 130 and detected using a charged coupled device camera (not shown). The data collection time is 5 s.

For wideband SHG measurements, the Nd:YAG pump laser light is augmented by an optical parametric amplifier (OPA) 108. Additional optical devices such as mirror 104, 106 and 110 can be utilized to facilitate the light transmission along a light path. The broadband SHG was characterized using a tunable laser instead of the 1.064 μm fundamental beam in order to measure the frequency dependence of SHG. The OPA 108 generates vertically polarized light pulses over the spectral ranges of 400-685 and 3156-737 nm. The repetition rate and pulse width are 10 Hz and 15 ps, respectively. The transmission mode is used since the OPA has an enlarged focal spot size compared to the fundamental beam of Nd:YAG laser. The enlarged focal spot results from aberrations in the OPA components.

Images of the second harmonic beam are captured by a second camera (Sony DSC-F55) 128, which is on the top of the optical workstation 122. When the laser focal point is above the BTO thin film waveguide, there is no SHG observed. The green light (not shown) that corresponds to SGH is maximized when the laser focal point is on the BTO thin film. Once the laser beam is focused below the BTO thin film layer and on the substrate, SHG is also not observed.

Figure 2:
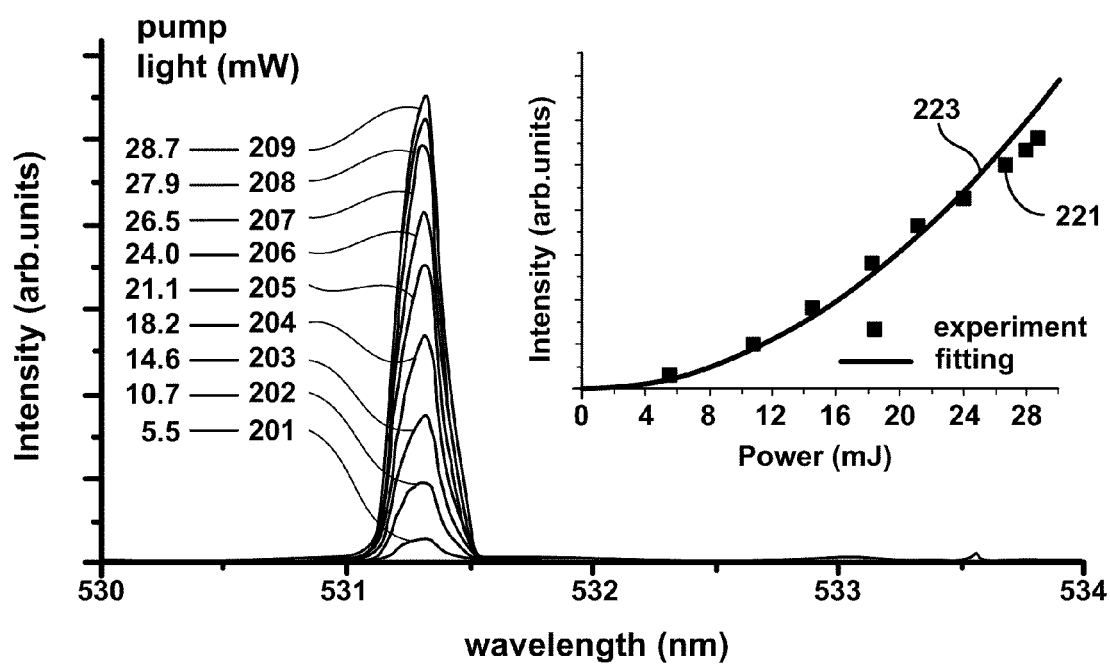
FIG. 2 shows SHG spectra vs pump intensity. The incident light wavelength is 1064 nm. The inset shows the SHG intensity as a function of pump field intensity. The experiment results are depicted by the black squares and the second order fitting is shown by the solid curve.

The SHG spectra from waveguide mode measurement are plotted as a function of pump intensity at 1.064 μm in FIG. 2. The incident pump light intensity is increased from 5 to 30 mJ, which generate curves 201, 202, 203, 204, 205, 206, 207, 208, and 209, respectively. The SHG intensity as a function of pump intensity is plotted in the inset, where curve 223 is a fitting curve corresponding to experimental results 221. These experimental results indicate that behavior P(2 w) a $P^2$(w) up to 24 mJ, where P(2 w) and P(w) is the incident pump power and the SHG intensity, respectively. The dependence is consistent with theory for bulk materials.

In this case, the SHG power P(2w) is given by following equation:

$$P(2\omega) = 1.068\left(\frac{128\pi^2\omega_1^3 d_{eff}^2 L}{c^4 n_1 n_2}\right)P^2(\omega), \quad (1)$$

where $n_1$ and $n_2$ is the refractive index for frequencies of 2 $w_1$ and $w_1$, deff is the second order nonlinear susceptibility, and L is the is the interaction length.[14,15] The power of the incident light is 24 mJ. There is a small redshift in the transmission mode. The cause of the redshift is currently under study. The conversion efficiency of waveguide mode is about 1.5 times higher than the transmission mode. A simplified model of the nonlinear optical interactions with a focused Gaussian laser beam is used to compare the difference of SHG power between waveguide and transmission mode.[14,15] Under optimal conditions L=3.2/Δk, where Δk is the difference in the wavevector defined as $2k_1-k_2$, where $k_1$ and $k_2$ are the wave vector numbers at w and 2 w. To calculate L, the beam profile needs to be considered. From the geometry of the optics, one can readily calculate the beam waist $z_0$ and confocal parameter b. Using the expression for beam waist $z_0 = k_1 w_0^2/2$ and $NA=2n_1/k_1 w_0$, where NA=0.65, the value for the confocal parameter b (=$2z_0$) is 2.8 μm and the beam waist $w_0$ is 0.50 μm. In the case of waveguide mode, the focused spot is inside the BTO thin film since the beam waist $w_0$ is close to the film thickness. As to L for waveguide mode, $L_{guide}$ is limited to the confocal parameter b=2.8 μm, where the incident pump light is focused by the objective lens. There it has highest intensity inside the area defined by $b^2$. In addition, the phase matching condition is only preserved when $L_{guide}$ is less than the coherence length. In contrast, the length for the transmission mode $L_{trans}$ is limited to the BTO film thickness, which in this case is equal to 0.5 μm. From Eq. (1), the nonlinear optical susceptibility deff for both modes are taken to be equal in our unpoled sample, the ratio of P(2w) between the waveguide and transmission mode is equal to $L_{guide}/L_{trans}$=5.6. The difference between the calculated and measured ratios of P(2w) presumably results from the optical loss or coupling efficiency in planar waveguide. Given the approximations involved and the fact that some of the light falls above and below the film when the beam is focused on the interior, the value is within experimental error. In the above analysis, differences in the coherence length factor when analyzing the wavelength dependence of $d_{eff}$ upon comparing P(2w) for different pump wavelengths are assumed to be negligible. For bulk BTO the coherence length, $l_c$=λ/4[n (w)−n(2w)], ranges from 1.6 to 2.9 μm over the spectral range of interest. Thus, the film thickness is much less than the coherence length.

Figure 3:
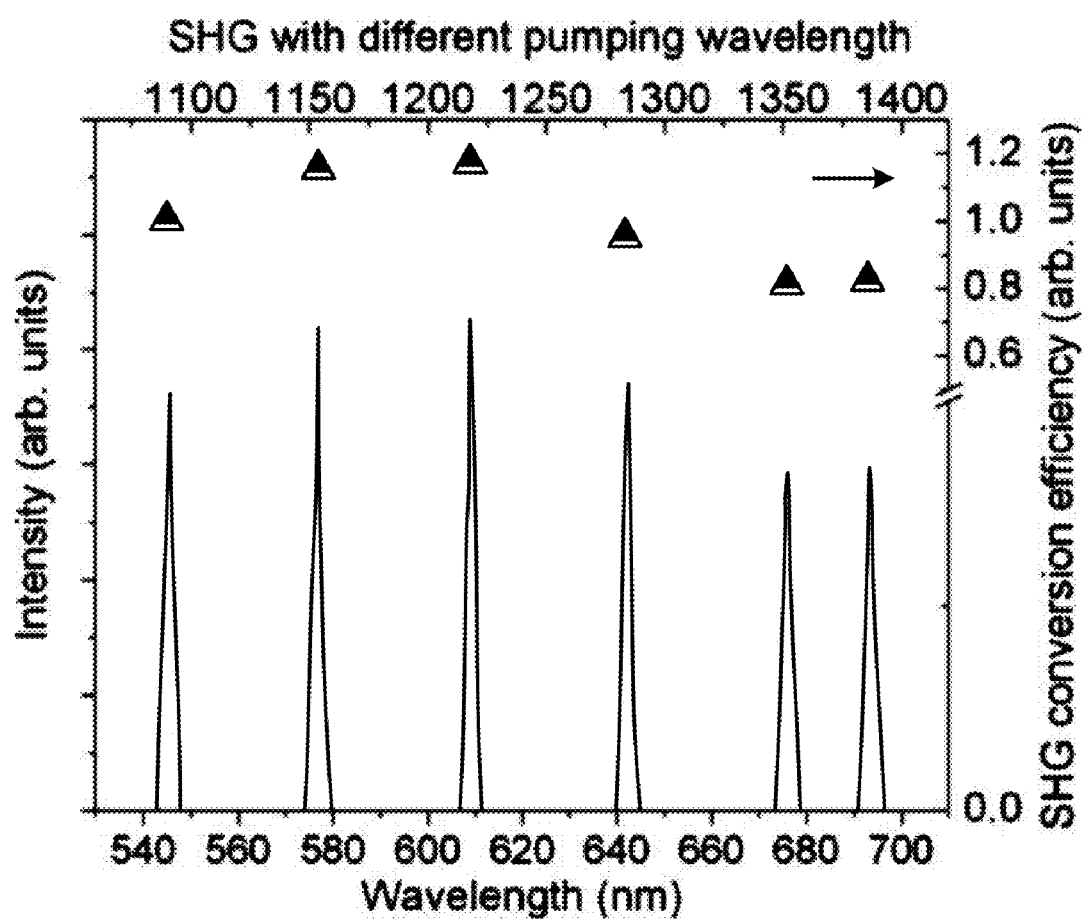
FIG. 3 shows SHG spectra when pump light wavelength is 1090, 1154, 1218, 1284, 1352, 1386 nm, respectively. The triangles are the normalized SHG conversion efficiency.
Figure 4:
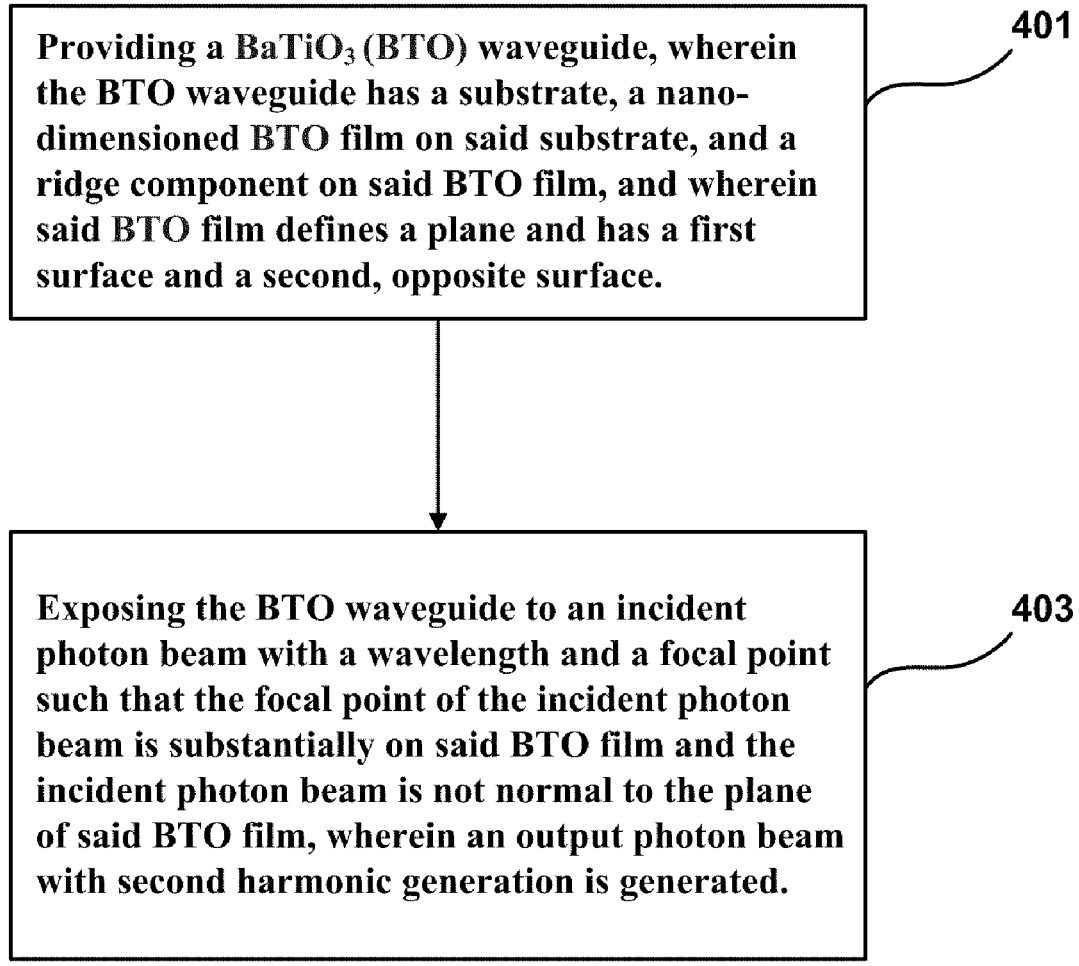
FIG. 4 shows a flow chart of a method for SHG according to one embodiment of the present application.

FIG. 3 shows the SHG spectra for a pump wavelength of 1090, 1154, 1218, 1284, 1352, and 1386 nm, respectively. The power of incident beam is 200 μJ. There is little change in the SHG power with pump wavelength. The inset shows the SHG conversion efficiency as a function of wavelength, where the value is normalized to one at a pump wavelength of 1090 nm. The measured second order nonlinear susceptibility $d_{eff}$ is 12.0 pm/V. Consequently, it is concluded that there is no significant variation in deff in the range of 1050-1330 nm. Nevertheless, there is some attenuation observed at longer wavelength of 1360 nm, which may be due to the two photon absorption.[12] The origin of the broad band response presumably results from the polydomain structure of the epitaxial thin films. Although the films are epitaxial, they can be considered disordered. They have a polydomain structure consisting of a and c domains. The domain structure was previously reported by Towner et al.[16] Prior work has shown that broad band SHG can be observed in disordered nonlinear media through random quasiphase matching.[1] However in that case, the SHG was predicted to be linear in pump power. Furthermore, the observed efficiency was predicted to be low.

It should be noted that the broadband SHG response by practicing the present invention is distinctively different yet consistent with a previous study of linear electro-optic effect in the polydomain BTO waveguides by Tang et al.[13] In that study, the linear electro-optic coefficient (($\gamma$)) from the Pockels effect showed little variation over the wavelengths of 973 and 1561 nm. The measured values of $\gamma$ are 420 pm/V at 973 nm and 360 pm/V at 1561 nm, respectively. This is consistent with both the SHG conversion efficiency and the linear electro-optic coefficient being linearly dependent on the second order susceptibility.[13] Thus, the broadband condition is applicable to both the SHG and Pockels effects.

In conclusion, highly efficient broadband SHG using polydomain epitaxial BTO thin film waveguides is discovered. Waveguides show characteristic broadband SHG over the visible spectral region of 530-700 nm. The waveguide mode has SHG conversion efficiency 1.5 times higher compared to the thin film transmission mode. The enhancement of conversion efficiency in the waveguides results from the increased nonlinear optical interaction length in the waveguide mode. The broadband SHG property is attributed to the polydomain structure of the ferroelectric that leads to reaching quasiphase matching. In contrast to theory, for disordered media, the SHG shows a quadratic dependence on pump intensity. Broadband SHG thin film sources should be useful in future integrated photonic circuits.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

LIST OF REFERENCES

[1] Y. Sheng, J. Dou, B. Ma, B. Cheng, and D. Zhang, Appl. Phys. Lett. 91, 011101 (2007).

[2] L. Misoguti, S. Backus, C. G. Durfee, R. Bartels, M. M. Murnane, and H. C. Kapteyn, Phys. Rev. Lett. 87, 013601 (2001).

[3] I. Tomita, M. Asobe, H. Suzuki, J. Yumoto, and Y. Yoshikuni, J. Appl. Phys. 100, 023120 (2006).

[4] S. Kurimura, Y. Kato, M. Maruyama, Y. Usui, and H. Nakajima, Appl. Phys. Lett. 89, 191123 (2006).

[5] M. Fiorentino, S. M. Spillane, R. G. Beausoleil, T. D. Roberts, P. Battle, and M. W. Munro, Opt. Express 15, 7479 (2007).

[6] M. B. Raybaut, R. Haïdar, P. Kupecek, P. Lemasson, and E. Rosencher, Nature (London) 432, 374 (2004).

[7] J. Li, Z. Li, Y. Sheng, and D. Zhang, Appl. Phys. Lett. 91, 022903 (2007).

[8] H. A. Lu, L. A. Wills, B. W. Wessels, W. P. Lin, T. G. Zhang, G. K. Wong, D. A. Neumayer, and T. J. Marks, Appl. Phys. Lett. 62, 1314 (1993).

[9] E. Mishina, A. Zaitsev, N. Ilyin, N. Sherstyuk, A. Sigov, Y. Golovko, V. Muhortov, A. Kolesnikov, Y. Lozovik, M. Yemtsova, and T. Rasing, Appl. Phys. Lett. 91, 041107 (2007).

[10] V. Vaithyanathan, J. Lettieri, W. Tian, A. Sharan, A. Vasudevarao, Y. L. Li, A. Kochhar, H. Ma, J. Levy, P. Zschack, J. C. Woicik, L. Q. Chen, V. Gopalan, and D. G. Schlom, J. Appl. Phys. 100, 024108 (2006).

[11] F. Niu, A. R. Meier, and B. W. Wessels, J. Cryst. Growth 294, 401 (2006).

[12] R. W. Boyd, *Nonlinear Optics* (Academic, London, 2003), Chap. 2.

[13] P. Tang, D. J. Towner, A. L. Meier, and B. W. Wessels, Appl. Phys. Lett. 85, 4615 (2004).

[14] G. D. Boyd and D. A. Kleinman, J. Appl. Phys. 39, 3597 (1968).

[15] J. E. Bjorkholm, Phys. Rev. 142, 126 (1966).

[16] D. J. Towner, T. J. Lansford, and B. W. Wessels, J. Electroceram. 13, 89 (2004).

What is claimed is:

1. A method for second harmonic generation, comprising the steps of:
   (a) providing a BaTiO$_3$ (BTO) waveguide, wherein the BTO waveguide has a substrate, a nano-dimensioned BTO film on said substrate, and a ridge component on said BTO film, and wherein said BTO film defines a plane and has a first surface and a second, opposite surface; and
   (b) exposing the BTO waveguide to an incident photon beam with a wavelength and a focal point such that the focal point of the incident photon beam is substantially on said BTO film and the incident photon beam is incident to the plane of said BTO film with an angle θ that is formed between the incident beam and the plane of said BTO film and satisfies the condition of 0<θ<90,
      wherein an output photon beam with second harmonic generation is generated, and wherein the focal point of the incident photon beam is located on the first surface of said BTO film or between the first surface and the second surface of said BTO film.

2. The method of claim 1, wherein the substrate comprises a MgO substrate.

3. The method of claim 1, wherein said ridge component comprises Si$_3$N$_4$ and has a thickness ranging from about 100 nm to about 300 nm, and said BTO film has a thickness ranging from about 300 nm to about 700 nm, is epitaxial and multidomain with a and c oriented ferroelectric domains, and has a coherence length larger than said thickness of said BTO film.

4. The method of claim 1, wherein the incident photon beam is from a laser, and the beam comprises a laser beam of photons.

5. The method of claim 4, wherein the laser is operable at a wavelength in the range of 10 to 5,000 nm and at an output intensity in the range of 0.5 to 1,000 mJ.

6. The method of claim 1, wherein the BTO waveguide is placed in a waveguide station having XYZ flexture stages such that the plane of said BTO film is parallel to one of the X-Y plane, the X-Z plane, and the Y-Z plane.

7. The method of claim 1, wherein the generated second harmonic generation has a conversion efficiency substantially independent of the wavelength of the incident photon beam over the visible spectra range.

8. A method for second harmonic generation, comprising the steps of:
(a) providing a layered structure, wherein the layered structure has a substrate, and a BTO film on said substrate, and wherein said BTO film defines a plane and has a first surface and a second, opposite surface; and
(b) exposing the layered structure to an incident photon beam with a wavelength and a focal point such that the focal point of the incident photon beam is substantially on said BTO film and the incident photon beam is not normal to the plane of said BTO film,
wherein an output photon beam with second harmonic generation is generated, and wherein the focal point of the incident photon beam is located on the first surface of said BTO film or between the first surface and the second surface of said BTO film.

9. The method of claim 8, wherein the substrate comprises a MgO substrate.

10. The method of claim 8, wherein said BTO film has a thickness ranging from about 300 nm to about 700 nm, is epitaxial and multidomain with a and c oriented ferroelectric domains, and has a coherence length larger than said thickness.

11. The method of claim 8, wherein the incident photon beam is from a laser, and the beam comprises a laser beam of photons.

12. The method of claim 11, wherein the laser is operable at a wavelength in the range of 10 to 5,000 nm and at an output intensity in the range of 0.5 to 1,000 mJ.

13. The method of claim 8, wherein the layered structure is a BTO waveguide that is placed in a waveguide station having XYZ flexture stages such that the plane of said BTO film is parallel to one of the X-Y plane, the X-Z plane, and the Y-Z plane.

14. A system for second harmonic generation, comprising:
(a) a BaTiO$_3$ (BTO) waveguide, wherein the BTO waveguide has a substrate, and a BTO film on said substrate, and wherein said BTO film defines a plane and has a first surface and a second, opposite surface; and
(b) an energy source for providing a photon beam with a wavelength; and
(c) optical means for receiving the photon beam from the energy source and focusing a corresponding photon beam with a focal point incident to the BTO waveguide such that the focal point of the incident photon beam is located on the first surface of said BTO film or between the first surface and the second surface of said BTO film, and the incident photon beam is not normal to the plane of said BTO film.

15. The system of claim 14, wherein said BTO film has a thickness ranging from about 300 nm to about 700 nm, is epitaxial and multidomain with a and c oriented ferroelectric domains, and has a coherence length larger than said thickness.

16. The system of claim 14, wherein the energy source comprises a laser, and the beam comprises a laser beam of photons.

17. The system of claim 15, wherein the laser is operable at a wavelength in the range of 10 to 5,000 nm and at an output intensity in the range of 0.5 to 1,000 mJ.

18. The system of claim 15, further comprising a waveguide station having XYZ flexture stages, wherein the BTO waveguide is placed in the waveguide station such that the plane of said BTO film is parallel to one of the X-Y plane, the X-Z plane, and the Y-Z plane.

19. The system of claim 15, wherein the optical means comprises at least one objective lens, which position relative to the BTO waveguide is adjustable.

20. A method for second harmonic generation, comprising the steps of:
(a) providing a waveguide, wherein the waveguide has a substrate, and a polydomain epitaxial thin film on said substrate wherein said polydomain epitaxial thin film defines a plane and has a first surface and a second, opposite surface defining a body portion of said polydomain epitaxial thin film therebetween with a film thickness, l, and wherein the polydomain epitaxial thin film has a coherence length, $l_c$; and
(b) exposing the waveguide to an incident photon beam with a wavelength and a focal point such that the incident photon beam is incident to the plane of said polydomain epitaxial thin film with an angle $\theta$ that is formed between the incident beam and the plane of said polydomain epitaxial thin film and satisfies the condition of $0<\theta<90$,
wherein an output photon beam with second harmonic generation is generated, and wherein said polydomain epitaxial thin film is formed with the following condition satisfied: $l<l_c$.

21. The method of claim 20, wherein said polydomain epitaxial thin film comprises a BTO film.

22. The method of claim 21, wherein the thickness l of said BTO film ranges from about 300 nm to about 700 nm, and wherein the coherence length of said BTO film $l_c$ ranges from 1,600 nm to 2,900 nm.

23. A system for second harmonic generation, comprising:
(a) a waveguide, wherein the waveguide has a substrate, and a polydomain epitaxial thin film on said substrate wherein said polydomain epitaxial thin film defines a plane and has a first surface and a second, opposite surface defining a body portion of said polydomain epitaxial thin film therebetween with a film thickness, l, and wherein the polydomain epitaxial thin film has a coherence length, $l_c$; and
(b) an energy source for providing a photon beam with a wavelength; and
(c) optical means for receiving the photon beam from the energy source and focusing a corresponding photon beam with a focal point incident to the waveguide such that the incident photon beam is incident to the plane of said polydomain epitaxial thin film with an angle $\theta$ that is formed between the incident beam and the plane of said polydomain epitaxial thin film and satisfies the condition of $0<\theta<90$,
wherein an output photon beam with second harmonic generation is generated, and wherein said polydomain epitaxial thin film is formed with the following condition satisfied: $l<l_c$.

24. The system of claim 23, wherein said polydomain epitaxial thin film comprises a BTO film.

25. The system of claim 24, wherein the thickness l of said BTO film ranges from about 300 nm to about 700 nm, and wherein the coherence length of said BTO film $l_c$ ranges from 1,600 nm to 2,900 nm.

26. The system of claim 23, wherein the energy source comprises a laser, and the beam is a laser beam of photons.

* * * * *

UNITED STATES PATENT AND TRADEMARK OFFICE
CERTIFICATE OF CORRECTION

| | | |
|---|---|---|
| PATENT NO. | : 7,898,730 B2 | Page 1 of 1 |
| APPLICATION NO. | : 12/561667 | |
| DATED | : March 1, 2011 | |
| INVENTOR(S) | : Bruce W. Wessels and Pao T. Lin | |

It is certified that error appears in the above-identified patent and that said Letters Patent is hereby corrected as shown below:

In the Specification:

In Column 1, Lines 34 to 37 delete:

~~This invention was made with Government support under Contract No. ECS0457610 awarded by National Science Foundation of the United States. Accordingly, the United States Government has certain rights in this invention.~~

Please add:

-- This invention was made with government support under grant number ECS-0457610 awarded by the National Science Foundation. The government has certain rights in the invention. --

Signed and Sealed this
Nineteenth Day of July, 2011

David J. Kappos
*Director of the United States Patent and Trademark Office*